(12) United States Patent
Nerella

(10) Patent No.: US 9,692,646 B2
(45) Date of Patent: Jun. 27, 2017

(54) SYSTEM AND METHOD FOR CONTROL OF REMOTE WIRELESS DATA DEVICES

(71) Applicant: Proxim Wireless Corporation, Fremont, CA (US)

(72) Inventor: Nagaraju Nerella, Hyderabad (IN)

(73) Assignee: PROXIM WIRELESS CORPORATION, Fremont, CA (US)

(*) Notice: Subject to any disclaimer, the term of this patent is extended or adjusted under 35 U.S.C. 154(b) by 193 days.

(21) Appl. No.: 14/639,608

(22) Filed: Mar. 5, 2015

(65) Prior Publication Data

US 2016/0198367 A1 Jul. 7, 2016

(30) Foreign Application Priority Data

Jan. 7, 2015 (IN) .............................. 56/DEL/2015

(51) Int. Cl.
*H04L 29/14* (2006.01)
*H04L 12/24* (2006.01)
*H04W 76/02* (2009.01)
*H04L 12/26* (2006.01)
*H04W 88/08* (2009.01)

(52) U.S. Cl.
CPC ...... *H04L 41/0816* (2013.01); *H04L 43/0811* (2013.01); *H04W 76/023* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 7,668,572 B2 | 2/2010 | Van de Water | |
| 2003/0202572 A1* | 10/2003 | Giddens | H04L 25/0262 375/225 |
| 2006/0128319 A1* | 6/2006 | Van de Water | H04L 12/10 455/73 |
| 2009/0249112 A1* | 10/2009 | Diab | H04L 12/10 714/2 |
| 2014/0115354 A1* | 4/2014 | Jabbaz | G06F 1/266 713/310 |

* cited by examiner

*Primary Examiner* — Benjamin Lamont
(74) *Attorney, Agent, or Firm* — Kilpatrick Townsend & Stockton LLP (57) ABSTRACT

A device that that is difficult to access may have procedures remotely initiated by the generation of signal patterns over an Ethernet network. The signal patterns include status of the Ethernet link (active, down), the duration of an active link and a down link, and the speed of data during the active link.

18 Claims, 7 Drawing Sheets

SYSTEM AND METHOD FOR CONTROL OF REMOTE WIRELESS DATA DEVICES

CROSS REFERENCES TO RELATED APPLICATIONS

This application claims priority from Indian Application No. 56/DEL/2015, filed on Jan. 7, 2015, which is incorporated herein by reference.

BACKGROUND OF THE INVENTION

With the extensive deployment of wireless networks, wireless transceivers and other wireless equipment are deployed in many locations, including locations that are difficult to physically access. As examples, wireless equipment may include wireless access points, Wi-Fi routers and other equipment located on rooftops, towers and utility poles.

A physical interaction is occasionally needed at the wireless equipment, such as actuating a reload or reset button. For example, a reload button may be used to initiate a reloading procedure that erases configuration parameters from the memory of a transceiver unit, such as when a unit does not start up properly or when a user has forgotten a password that can be used to access the unit. A reset button may be used to restart the software in the transceiver unit when the equipment performs an operation that results in an undesirable condition (such as an unknown, frozen or "hung" state). When the wireless equipment is at a location that is not easy to physically access, actuating a reset or reload button can be burdensome (requiring ladders or other tools/equipment) and can result in downtime and inconvenience to users.

BRIEF SUMMARY OF THE INVENTION

There is provided, in accordance with embodiments of the present invention, a network/system and method for controlling a remote wireless device.

In one embodiment, a system is provided for initiating a procedure, at a wireless device in an Ethernet cable network that is not easily accessible. The system includes a transceiver at the wireless device and a processor at the wireless device. The transceiver includes: an input for receiving signals at the transceiver unit, the signals having features that include at least one or more specified lengths of active and down states for an Ethernet link and one or more specified signal frequencies for the Ethernet link when in an active state; an output providing state data representing the state of the Ethernet link and providing frequency data representing the frequency of the data signals on the Ethernet link when in the active state. The processor receives, from the transceiver, the state data representing the state of the Ethernet link and the frequency data representing the frequency of the signal when the state is active, determines if the state data and the frequency data match a predefined pattern of signals, and initiates a procedure at the wireless device if the received signal pattern matches the predefined pattern.

A more complete understanding of the present invention may be derived by referring to the detailed description of the invention and to the claims, when considered in connection with the Figures.

DETAILED DESCRIPTION OF THE INVENTION

Figure 1:
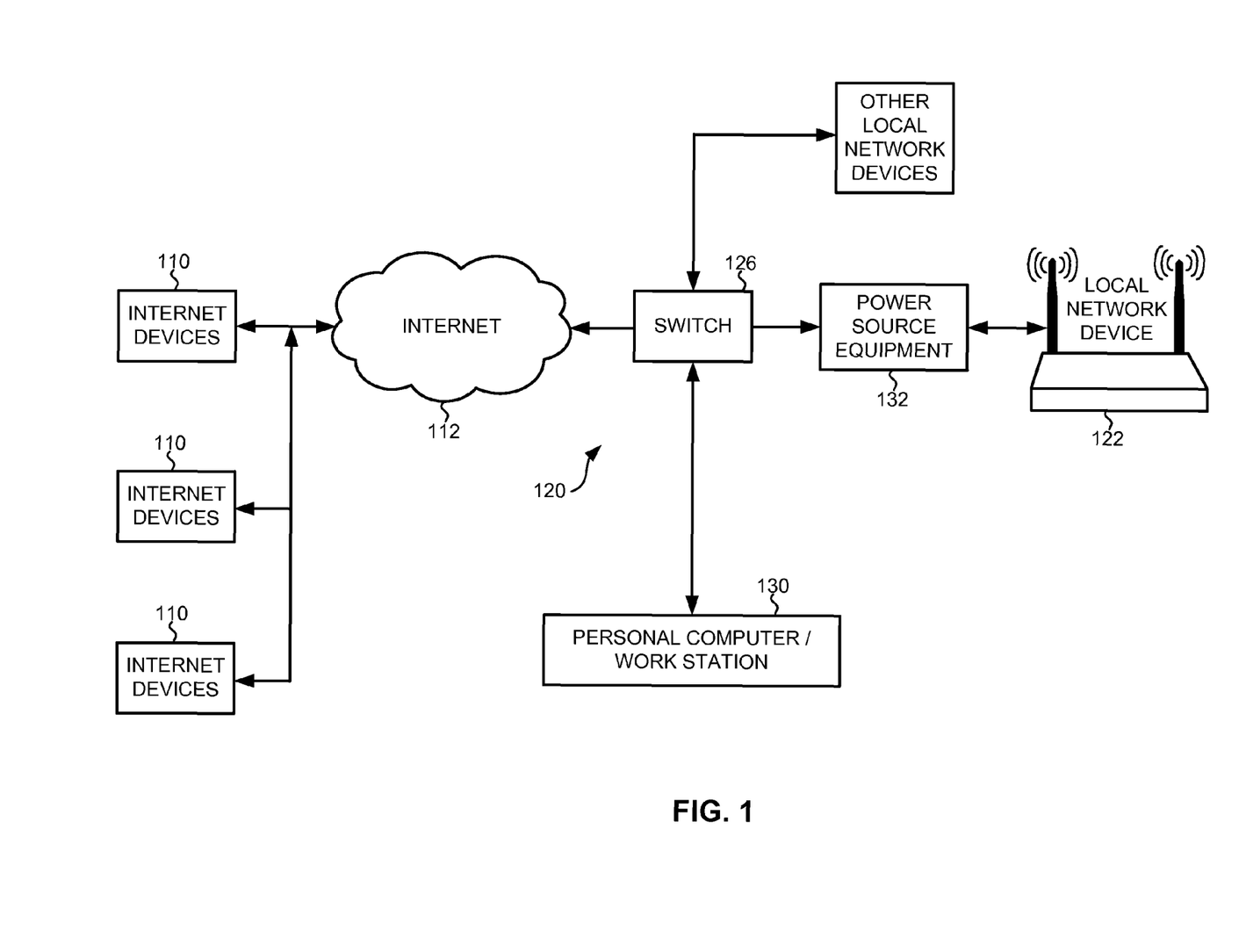
FIG. 1 is a general block diagram illustrating various devices interconnected over the Internet, including a local network device for wirelessly communicating with wireless users.

There are various embodiments and configurations for implementing the present invention. One such implementation is shown in FIG. 1, where according to an embodiment of the invention, a plurality of devices 110 are connected for communication with each other over a network 112, which may be a public network (the Internet) or a dedicated private network. Some of the devices may be part of local networks (which may be, in turn, connected to the Internet), such as the illustrated local network 120. The network 120 includes a local network wireless device 122 which may be a wireless access point and which may be located in a difficult-to-access location, such as outdoors on a rooftop, utility pole or tower. In one embodiment, the device 122 may communicate with wireless users over a Wi-Fi network implemented under IEEE 802.11. However, it is anticipated that other implementations of wireless networks using the device 122 are possible, such as wireless mesh networks, wireless wide area networks, metropolitan area networks, or fixed wireless networks (e.g., implemented using point-to-point links between devices at distant locations, such as by dedicated microwave or modulated laser light beams over line of sight paths).

In described embodiments, the local network 120 is an Ethernet network with the local network device 122 connected through an Ethernet switch 126 (via Ethernet cabling) to other local network devices and to a personal computer/workstation 130. The personal computer 130 may be used by an operator/administrator of the local network 120 to, among other things, control various operations within the network, as will be described shortly.

In the local network 120, since the device 122 is located at a difficult-to-access location, the device 122 receives power (as well as data) through power source equipment (PSE) 132, implemented using Power over Ethernet (PoE) technology, with two or four twisted-pair lines from the PSE 132. As typical in wireless local area networks, when a user having a wireless enabled device desires to communicate with other users over the Internet, the wireless enabled device communicates over the Wi-Fi network implemented at the device 122, with data signals passing from user devices through the device 122, PSE 132 and Ethernet switch 126, to other devices in the local network 120 or to other devices 110 connected to the Internet 112.

As will be described shortly, an operator/administrator of the local network 120 may need to initiate certain procedures or operations at local network devices, such as the device 122. If the device 122 were at an accessible location, such a procedure might be initiated by pushing a reset or reload button at the device. However, since the device 122 is at a difficult-to-access location, significant effort may be needed to operate buttons on the device 122. While various arrangements have been proposed for remotely initiating procedures at a remote wireless transceiver through action at power source equipment, such as by controlling the polarity of voltage provided by the power source equipment (see, e.g., U.S. Pat. No. 7,668,572, which is hereby incorporated by reference), such arrangements require access to the power source equipment (which itself may be difficult to access) and may additionally require special circuitry and other considerations at the power source. The present invention provides various advantages in eliminating special circuitry and other considerations at the power source equipment or at remote devices (such as device 122).

Figure 2:
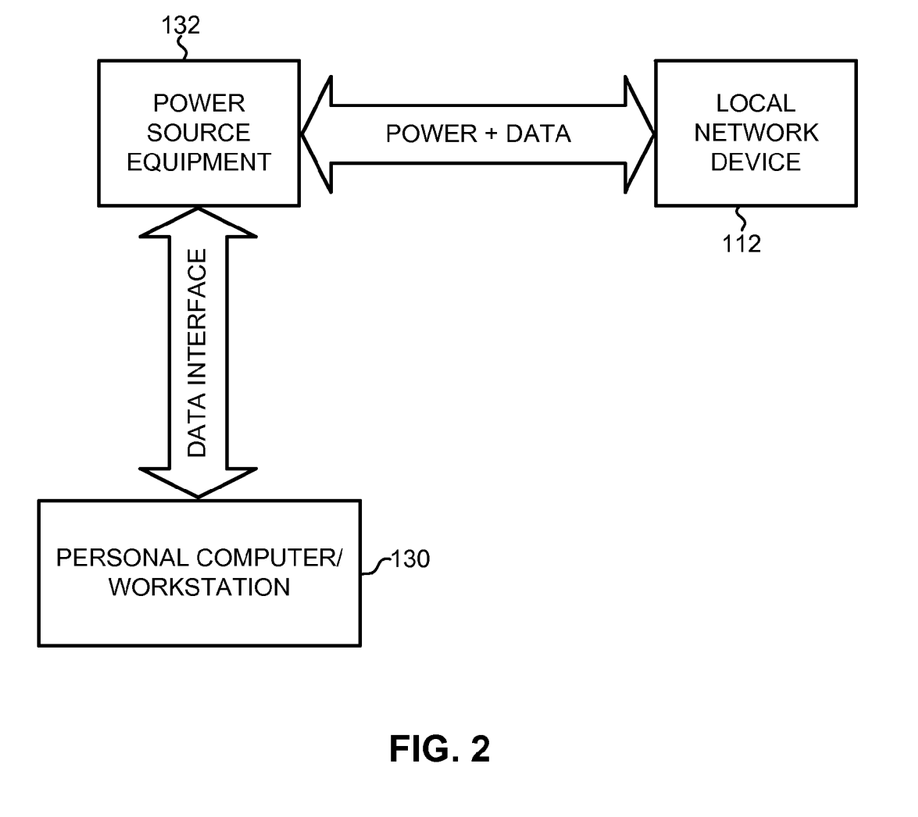
FIG. 2 illustrates a personal computer connected through a local Ethernet network to a local network device.

FIG. 2 illustrates the physical layer (PHY) connection of the personal computer 130 connected through Ethernet switch 126 and PSE 132 to the device 122. In particular, when a user at the personal computer 130 desires to initiate a reset or reload procedure at the device 122, the MAC address of the interface (network interface controller or NIC) at the device 122 is provided to the switch to create a physical data link between the workstation 130 and the device 122 (through the PSE 132). As seen in FIG. 2, data signals are provided from the personal computer 130 the PSE 132 which in turn provides the data, along with power, to the device 122. As will be described shortly, the signals present on the data link between workstation 130 and the device 122 can be used, in accordance with embodiments of the invention, to select and initiate a procedure at the device 122.

Figure 3:
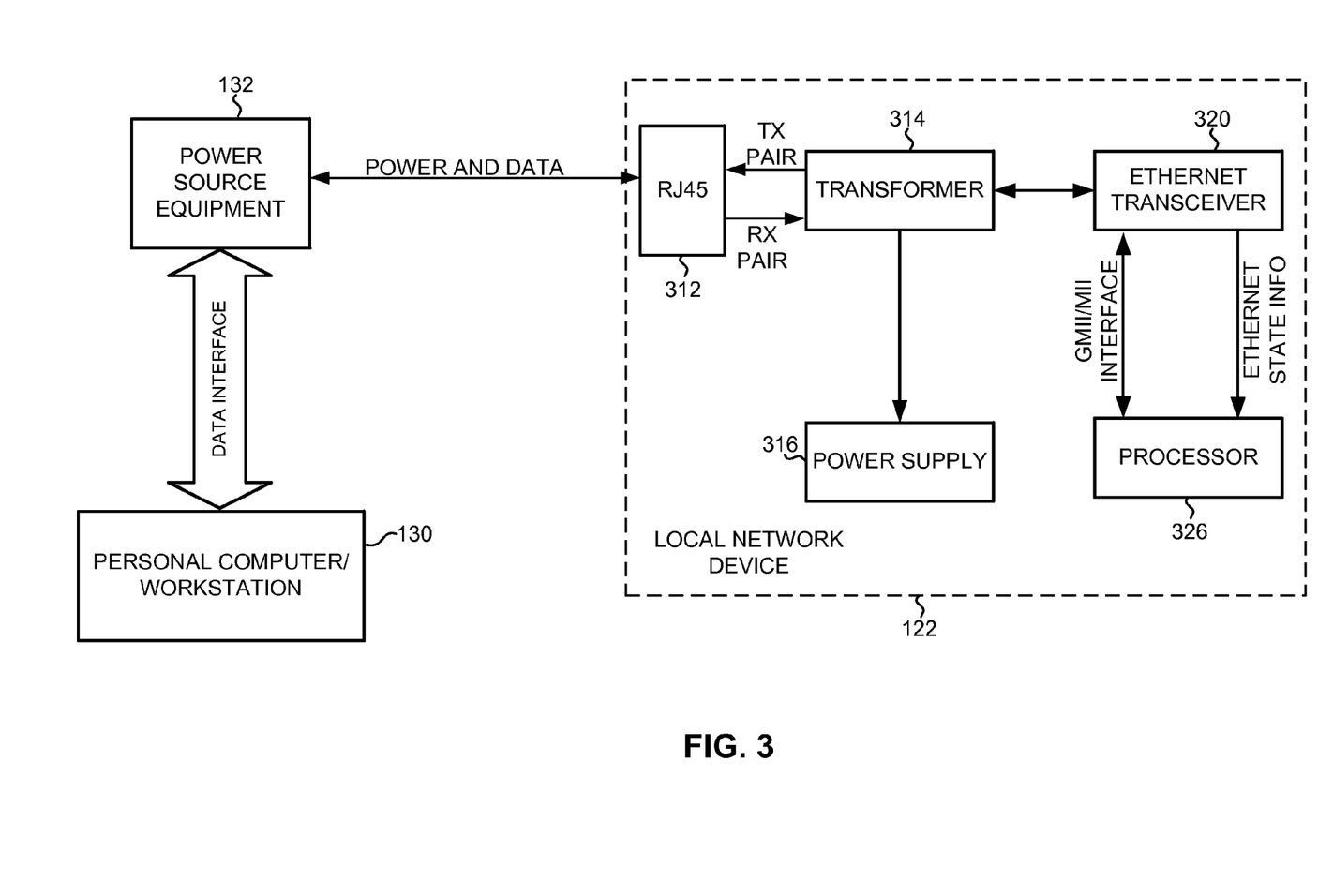
FIG. 3 illustrates details of a personal computer and local network device (such as seen in FIG. 2) that are connected within a local area network for purposes of initiating a reset or reload procedure at the local network device.

Turning now to FIG. 3, there is illustrated in greater detail components of the local network device 122 and its connections through PSE 132 to the personal computer 130, at the physical (PHY) layer (OSI and IEEE 802.3 reference models). As will be more fully described shortly, a pattern of signals are generated at the personal computer 130 and are passed through the data interface between the personal computer 130 and the power source equipment 132. Power and data signals are provided from the PSE 132 to an RJ45 connector 312, which connects over a twisted-pair of transmission (TX) wires and twisted-pair of receiving (RX) wires to a transformer 314. The transformer converts signals over the twisted wire pairs to a power voltage provided to a power supply 316 (that powers the components of the device 122) and to data signals provided to an Ethernet transceiver 320.

The transceiver 320 provides information concerning the transmitted/received data signals through a GMII/MII interface (Gigabit Media Independent Interface/Media Independent Interface) to a device processor 326. In accordance with IEEE standard 802.3, the GMII as a data interface receives (among other things) a clock signal RXCLK that is recovered/captured from the data signals and that indicates the speed (1000 Mb/100 Mb/10 Mb) of the data signals received at the network device 122. The Ethernet transceiver 320 likewise provides Ethernet state information and speed (1000 Mb/100 Mb/10 Mb) to the processor 326 via a management interface associated with the GMII/MII (the management interface is known as a Serial Management Interface (SMI) or a Management Input/Output (MDIO)). In particular, the SMI/MDIO allows the processor to read PHY registers (registers implemented in the Ethernet Physical layer that hold control and status information to understand the state of the Ethernet Physical layer (PHY)). The Ethernet state information relates to the state of the link between the personal computer 130 and the device 122 (link active/link down, speed, duplex (Half/Full)), and can be provided by register access in the Ethernet Physical layer. Based on the speed, the data will be transferred to the processor via GMII/MII interface. The processor will thus have the state of the Ethernet link (Link/Speed/Duplex), and that information may be used to detect a pattern of signals generated at the personal computer 130 that will initiate a reset/reload procedure at the device 122, based on recognition of signal patterns by the processor 326.

Figure 4:
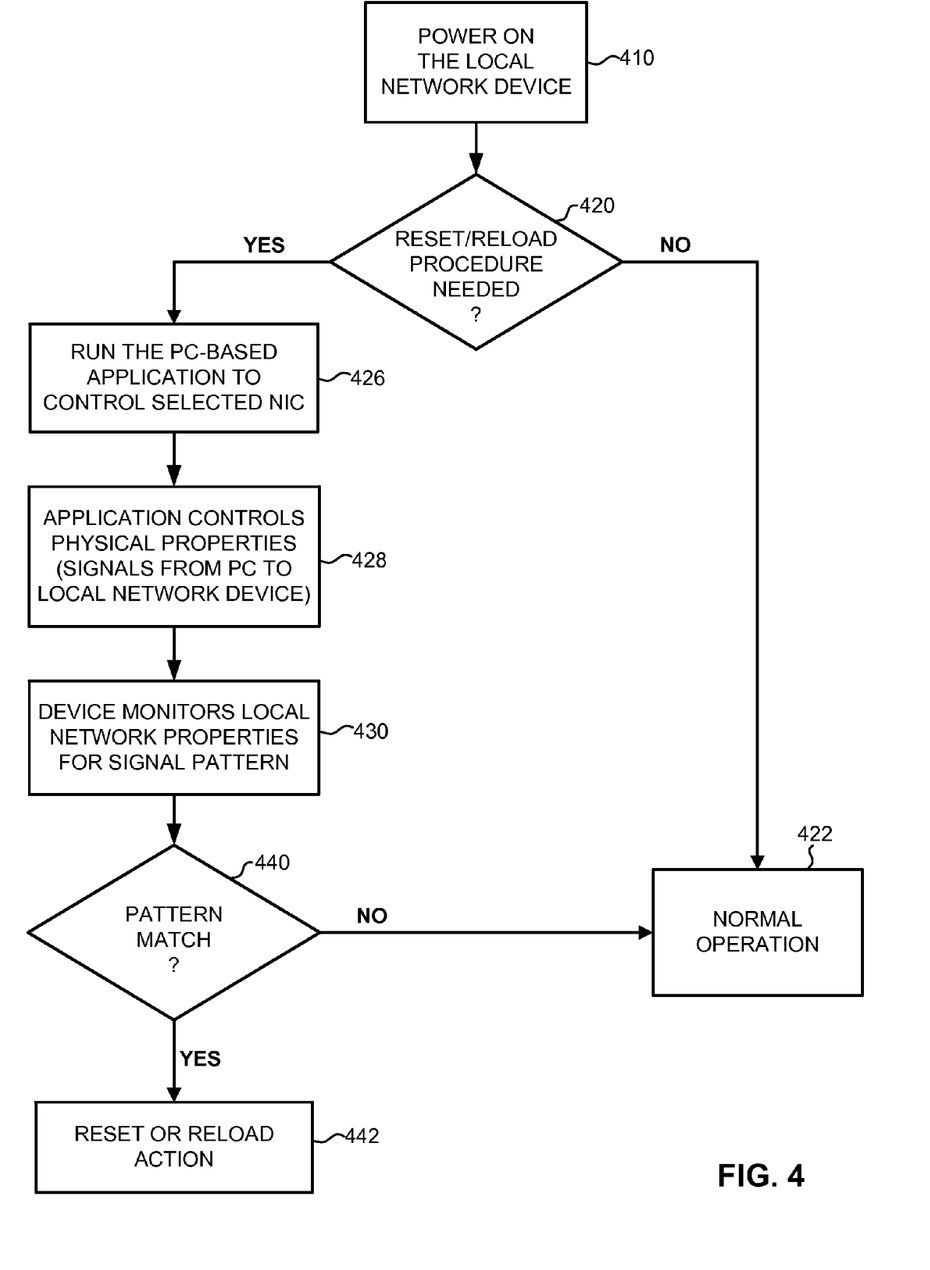
FIG. 4 is a flow diagram illustrating the operation of the connected personal computer and local network device seen in FIG. 3, when a reset or reload procedure is requested.

FIG. 4 illustrates processes implemented within the personal computer 130 and the processor 326 for generating and detecting signal patterns that will initiate procedures at the device 122. While described embodiments herein are directed toward the initiation of a reset procedure or a reload procedure at the device 122, it should be appreciated that other types of procedures or operations may likewise be initiated.

The processes in FIG. 4 begin at step 410 with power being provided to the local network device 122 (through the PSE 132). As mentioned earlier, power is provided over the network 120 by way of signals received through the PSE 132. When the device 122 is powered and working, it may become apparent that a procedure needs to be performed at device 122, such as the device 122 exhibiting an unknown or "hung" state to one of the users on the local area network 120. If a reset/reload procedure is not needed, then the device 122 resumes normal operation, at step 422 (e.g. operating as a communications path for wireless users in communication with the device 122).

If it is determined that a reset or reload event/procedure is needed at the device 122, step 420, then an application in software resident at the personal computer 130 is run in order to generate data signals to be received at the device 122. The personal computer 130 establishes a connection over the local network with the device 122 (by using a MAC address to control the NIC of the device 122), and the personal computer generates a pattern of signals for the local device, step 428. The local device 122 monitors the properties (signals) on the link with the personal computer 130 (step 430) and determines whether a pattern associated with those signals matches a predetermined pattern that indicates the need to initiate a reset or reload procedure, step 440. If a pattern match is detected, then the local device initiates (using a software program executed at the processor 326 in the device 122) the desired procedure, at step 442. During any period of time that the local device 122 does not detect a pattern match (at step 440), the local device 122 continues with normal operation at step 422.

The selection of the action or procedure undertaken at step 442 can be based on the specific signal pattern detected at step 440. For example, one predetermined pattern (i.e., preselected set of data speeds and durations of active and down links) may indicate one type of procedure, and another predetermined pattern (a different preselected set of data speeds and durations) may reflect a second type of procedure to be initiated at the local device 122. This is illustrated more fully in FIGS. 5 and 6.

Figure 5:
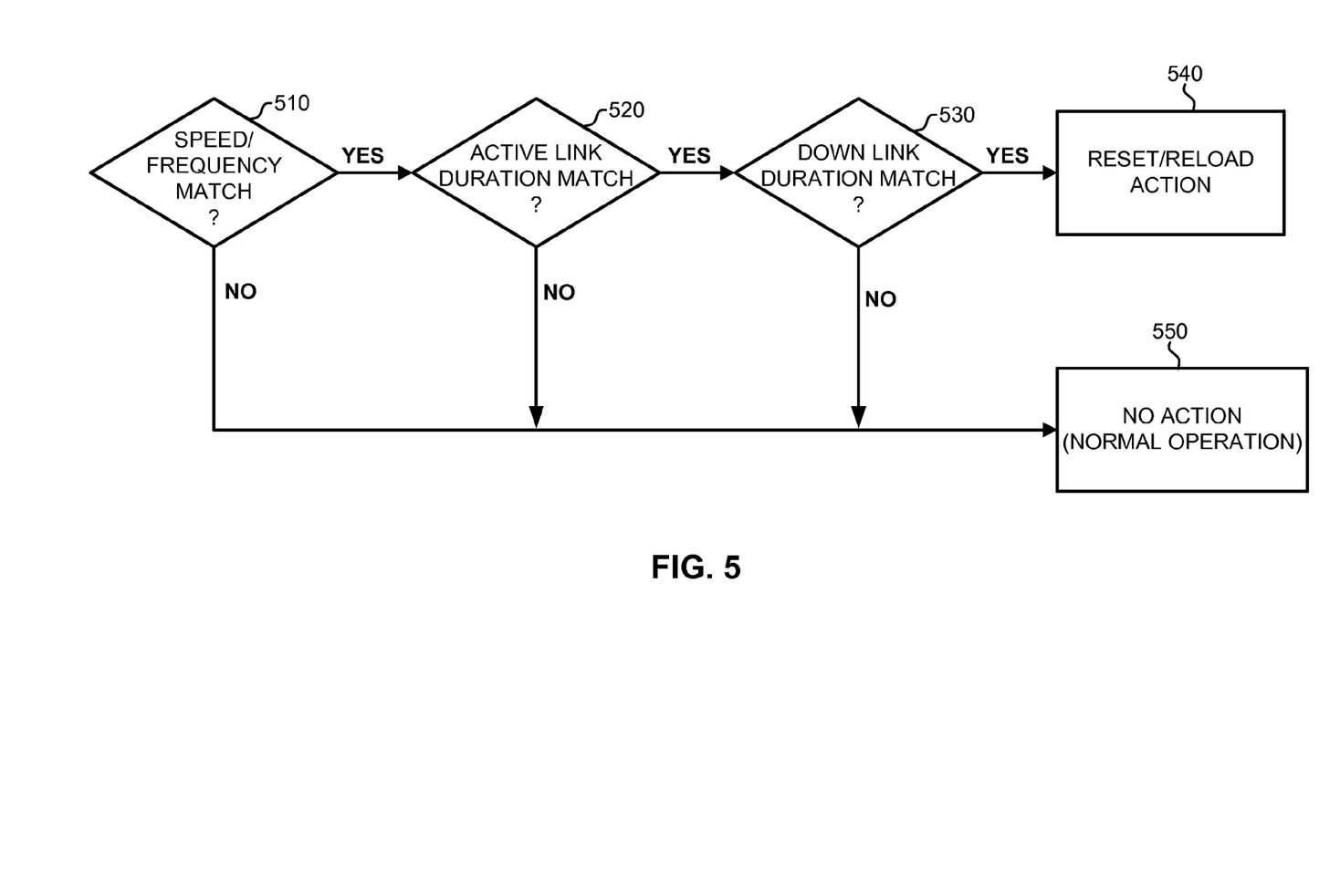
FIG. 5 is a flow diagram illustrating a process implemented within the local network device for detecting a pattern of signals that initiates a reset or reload procedure.

Turning to FIG. 5, there is illustrated a process implemented within step 440 of FIG. 4 for detecting a signal pattern received at the device 122 for initiating any one of multiple procedures or operations. It should be appreciated that a signal pattern (such as the one being detected in the process of FIG. 5) has been chosen/determined in advance in order to exhibit unique characteristics, and may be only one of several or more patterns that could be generated in response to execution of code or software running on the personal computer 130. For the pattern illustrated in FIG. 6, a reload procedure is to be initiated in response to several active and down links detected (data signals being present on the link when the link is active and no valid data signals being detected on the link when the link is down). The active and down links each have a duration (X, 2X) and during each period of time during which there is an active link, the data signals having a predetermined data speed or frequency (e.g. 1000 Mbps, 100 Mbps, 10 Mbps). Thus, in the specific example illustrated in FIG. 6, the signal pattern giving rise to a reload procedure is an initial active link having a duration X (e.g., one second) where the data speed is 1000 Mbps, a down link of the same duration X, an active link of 2X where the data speed is 100 Mbps, and then a downlink having a duration of 2X. As should be apparent, other patterns are possible involving active and down links of predetermined duration and data speeds.

Returning to FIG. 5, the device 122 first determines the speed or frequency of the data and whether it matches the predefined data speed reflecting that an operation is to take place, step 510. At step 520, the device determines if the duration of the active link matches the predefined pattern, and at step 530 the device determines whether the duration of the downlink matches the predefined pattern. If there are matches at steps 510, 520 and 530, then the appropriate reset or reload action is taken at step 540. If there is not a match at any one of the steps 510, 520 and 530, then no action is undertaken and the device 122 continues normal operation, step 550.

Figure 6:
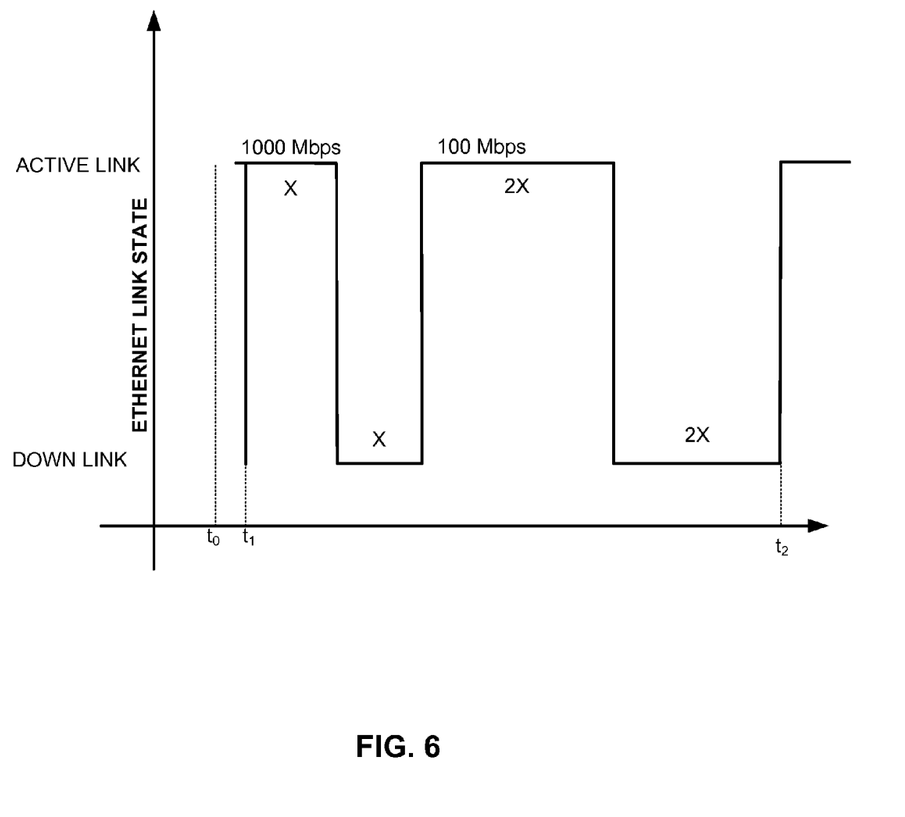
FIG. 6 is a timing diagram illustrating a pattern of signals received at the local network device that initiates a reload procedure.

The signal pattern illustrated in FIG. 6, as determined to be present in the process of FIG. 5, reflects that an operation (a reload procedure) should take place at device 122. Specifically, in FIG. 6, at time $t_0$, the device 120 is powered via the network and able to receive signals through its interface. At the time $t_1$, the personal computer 130 begins generating the signal pattern that requests the device 122 initiate a reload procedure. The signal pattern is generated and then ends at time $t_2$, when it is recognized by the device 122 as a request to initiate a reload procedure and that reload procedure begins at the device 122.

It should be appreciated, of course, that the pattern illustrated in FIG. 6 is only exemplary, and through the use of various data speeds and durations of active and down links, a number of different procedures could be initiated, each corresponding to one of the different signal patterns.

Figure 7:
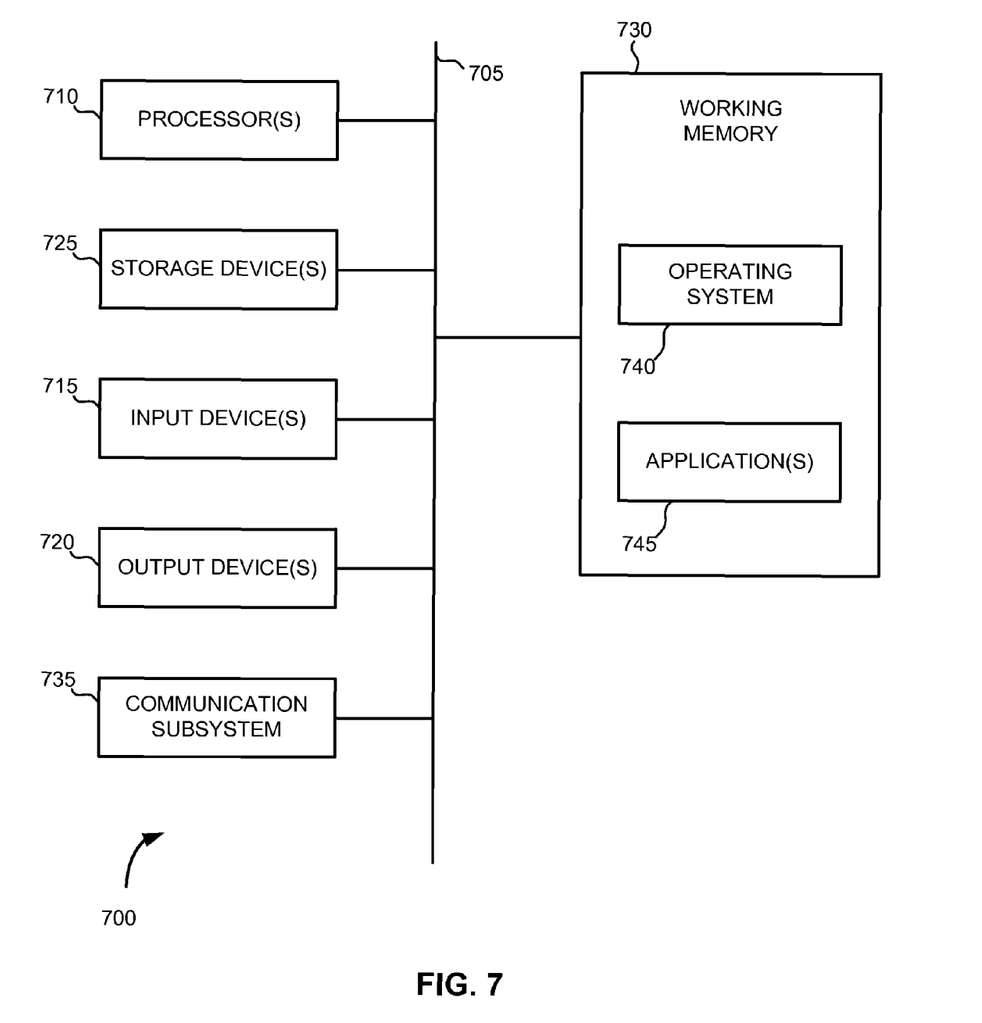
FIG. 7 is a block diagram illustrating an exemplary computer system upon which embodiments of the present invention may be implemented.

FIG. 7 is a block diagram illustrating an exemplary computer system upon which embodiments of the present invention may be implemented. This example illustrates a computer system 700 such as may be used, in whole, in part, or with various modifications, to provide the functions of the local device 122 and the personal computer 130, as well as other components and functions of the invention described herein.

The computer system 700 is shown comprising hardware elements that can be electrically coupled or otherwise in communication via a bus 705. The hardware elements can include one or more processors 710, including, without limitation, one or more general-purpose processors and/or one or more special-purpose processors (such as digital signal processing chips, graphics acceleration chips, and/or the like); one or more input devices 715, which can include, without limitation, a mouse, a keyboard and/or the like; and one or more output devices 720, which can include, without limitation, a display device, a printer and/or the like.

The computer system 700 may further include one or more storage devices 725, which can comprise, without limitation, local and/or network accessible storage or memory systems having computer or machine readable media. Common forms of physical and/or tangible computer readable media include, as examples, a floppy disk, a flexible disk, hard disk, magnetic tape, or any other magnetic medium, an optical medium (such as CD-ROM), punch-cards, papertape, any other physical medium with patterns of holes, a random access memory (RAM), a read only memory (ROM) which can be programmable or flash-updateable or the like, and any other memory chip, cartridge, or medium from which a computer can read data, instructions and/or code. In many embodiments, the computer system 700 will further comprise a working memory 730, which could include (but is not limited to) a RAM or ROM device, as described above.

The computer system 700 also may further include a communications subsystem 735, such as (without limitation) a modem, a network card (wireless or wired), an infra-red communication device, or a wireless communication device and/or chipset, such as a Bluetooth® device, an 802.11 device, a WiFi device, a WiMax device, a near field communications (NFC) device, cellular communication facilities, etc. The communications subsystem 735 may permit data to be exchanged with a network, and/or any other devices described herein. Transmission media used by communications subsystem 735 (and the bus 705) include copper wire, coaxial cables and fiber optics. Hence, transmission media can also take the form of waves (including without limitation radio, acoustic and/or light waves, such as those generated during radio-wave and infra-red data communications).

The computer system 700 can also comprise software elements, illustrated within the working memory 730, including an operating system 740 and/or other code, such as one or more application programs 745, which may be designed to implement, as an example, the processes seen in FIGS. 4 and 5.

As an example, one or more methods discussed earlier might be implemented as code and/or instructions executable by a computer (and/or a processor within a computer). In some cases, a set of these instructions and/or code might be stored on a computer readable storage medium that is part of the system 700, such as the storage device(s) 725. In other embodiments, the storage medium might be separate from a computer system (e.g., a removable medium, such as a compact disc, etc.), and/or provided in an installation package with the instructions/code stored thereon. These instructions might take the form of code which is executable by the computer system 700 and/or might take the form of source and/or installable code, which is compiled and/or installed on the computer system 700 (e.g., using any of a variety of generally available compilers, installation programs, compression/decompression utilities, etc.). The communications subsystem 735 (and/or components thereof) generally will receive the signals (and/or the data, instructions, etc., carried by the signals), and the bus 705 then might carry those signals to the working memory 730, from which the processor(s) 705 retrieves and executes the instructions. The instructions received by the working memory 730 may optionally be stored on storage device 725 either before or after execution by the processor(s) 710.

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention.

Moreover, while the various flows and processes described herein (e.g., those illustrated in FIGS. 4 and 5 are described in a particular order for ease of description, unless the context dictates otherwise, various procedures may be reordered, added, and/or omitted in accordance with various embodiments of the invention.) Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for initiating a procedure at a wireless device in an Ethernet cable network and that is not easily accessible, the system comprising:
   a transceiver at the wireless device; and
   a processor at the wireless device;
   the transceiver comprising:
      an input for receiving signals at the transceiver unit, the signals comprising a signal pattern having features that include at least one or more specified lengths of active and down states for an Ethernet link and one or more specified signal frequencies representing data speed for the Ethernet link when in an active state;
      an output providing state data representing the state of the Ethernet link and providing frequency data representing the data speed on the Ethernet link when in the active state;
   the processor for:
      receiving, from the transceiver, the state data representing the state of the Ethernet link and the frequency data representing the data speed when the state is active;
      determining if the state data and the frequency data match a predefined pattern of signals, wherein the predefined pattern of signals comprise a first active state having a first data speed of predefined duration, a first down state of predefined duration, a second active state having a second, different data speed of predefined duration, and a second downstate of predefined duration; and
      initiating a reload or reset procedure at the wireless device if the received signal pattern matches the predefined pattern.

2. The system of claim 1, wherein the system further comprises a workstation connected to the Ethernet cable network and for receiving a user input for a command to initiate the reload or reset procedure, and for generating the signals over the Ethernet cable network connecting the workstation to the wireless device.

3. The system of claim 2, wherein the workstation is located remotely from the wireless device.

4. The system of claim 1, wherein the wireless device comprises a wireless access point.

5. The system of claim 1, wherein the procedure is a reset procedure.

6. The system of claim 1, wherein the procedure is a reload procedure.

7. The system of claim 1, wherein the wireless device is a wireless access point in a Wi-Fi network.

8. The system of claim 1 wherein the wireless device is powered via an Ethernet cable in the Ethernet cable network.

9. The system of claim 1, wherein a plurality of different procedures may be initiated at the wireless device, with each different procedure associated with a different predetermined signal pattern.

10. A method for initiating a procedure at a wireless device in an Ethernet cable network and that is not easily accessible, the system comprising:
    receiving signals at the transceiver unit, the signals comprising a signal pattern having features that include at least one or more specified lengths of active and down states for an Ethernet link and one or more specified signal frequencies representing data speed for the Ethernet link when in an active state;
    providing state data representing the state of the Ethernet link and providing frequency data representing the data speed on the Ethernet link when in the active state;
    determining if the state data and the frequency data match a predefined pattern of signals, wherein the predefined pattern of signals comprise a first active state having a first data speed of predefined duration, a first down state of predefined duration, a second active state having a second, different data speed of predefined duration, and a second downstate of predefined duration; and
    initiating a reload or reset procedure at the wireless device if the received signal pattern matches the predefined pattern.

11. The method of claim 10, wherein the method further comprises receiving, at a workstation connected to the Ethernet cable network, a user input for a command to initiate the reload or reset procedure, and for generating the signals over the Ethernet cable network connecting the workstation to the wireless device.

12. The method of claim 11, wherein the workstation is located remotely from the wireless device.

13. The method of claim 10, wherein the wireless device comprises a wireless access point.

14. The method of claim 10, wherein the procedure is a reset procedure.

15. The method of claim 10, wherein the procedure is a reload procedure.

16. The system of claim 10, wherein the wireless device is a wireless access point in a Wi-Fi network.

17. The system of claim 10, wherein the wireless device is powered via an Ethernet cable in the Ethernet cable network.

18. The system of claim 10, wherein a plurality of different procedures may be initiated at the wireless device, with each different procedure associated with a different predetermined signal pattern.

* * * * *